United States Patent
Yen

(10) Patent No.: US 8,659,541 B2
(45) Date of Patent: Feb. 25, 2014

(54) HIGH EFFICIENCY ELECTRONIC DISPLAY DEVICE AND DISPLAY SYSTEM USING THE SAME

(75) Inventor: Chih-Chien Yen, Taipei County (TW)

(73) Assignee: Star-Reach Corp., New Taipei (TW)

( * ) Notice: Subject to any disclaimer, the term of this patent is extended or adjusted under 35 U.S.C. 154(b) by 731 days.

(21) Appl. No.: 12/949,768

(22) Filed: Nov. 18, 2010

(65) Prior Publication Data

US 2011/0084952 A1 Apr. 14, 2011

Related U.S. Application Data

(63) Continuation-in-part of application No. 11/152,200, filed on Jun. 15, 2005, now abandoned.

(51) Int. Cl.
*G09G 3/34* (2006.01)

(52) U.S. Cl.
USPC .............. 345/107; 345/30; 345/39; 345/46; 345/55; 345/204

(58) Field of Classification Search
USPC ................... 345/204–207, 210–215, 30–111
See application file for complete search history.

(56) References Cited

U.S. PATENT DOCUMENTS

| | | | |
|---|---|---|---|
| 6,621,766 B2* | 9/2003 | Brewer et al. | 368/82 |
| 6,817,123 B2* | 11/2004 | Okazaki et al. | 40/452 |
| 7,956,820 B2* | 6/2011 | Huitema et al. | 345/3.1 |
| 2002/0033793 A1* | 3/2002 | Machida et al. | 345/107 |
| 2003/0179169 A1* | 9/2003 | Izumi | 345/87 |
| 2004/0145562 A1* | 7/2004 | Horikiri | 345/107 |
| 2005/0012708 A1* | 1/2005 | Liu | 345/107 |
| 2005/0162737 A1* | 7/2005 | Whitehead et al. | 359/454 |

* cited by examiner

*Primary Examiner* — Christopher E Leiby
(74) *Attorney, Agent, or Firm* — CKC & Partners Co., Ltd.

(57) ABSTRACT

The present invention is related to a high efficiency electronic display device comprising a plurality of EPDs and a plurality of LEDs, [especially to a like electronic paper display equipment made by EPD and the adding cooperation for LED]. Therefore, the device is capable of display information by means of EPD in the daytime and LED light while not having enough light.

12 Claims, 5 Drawing Sheets

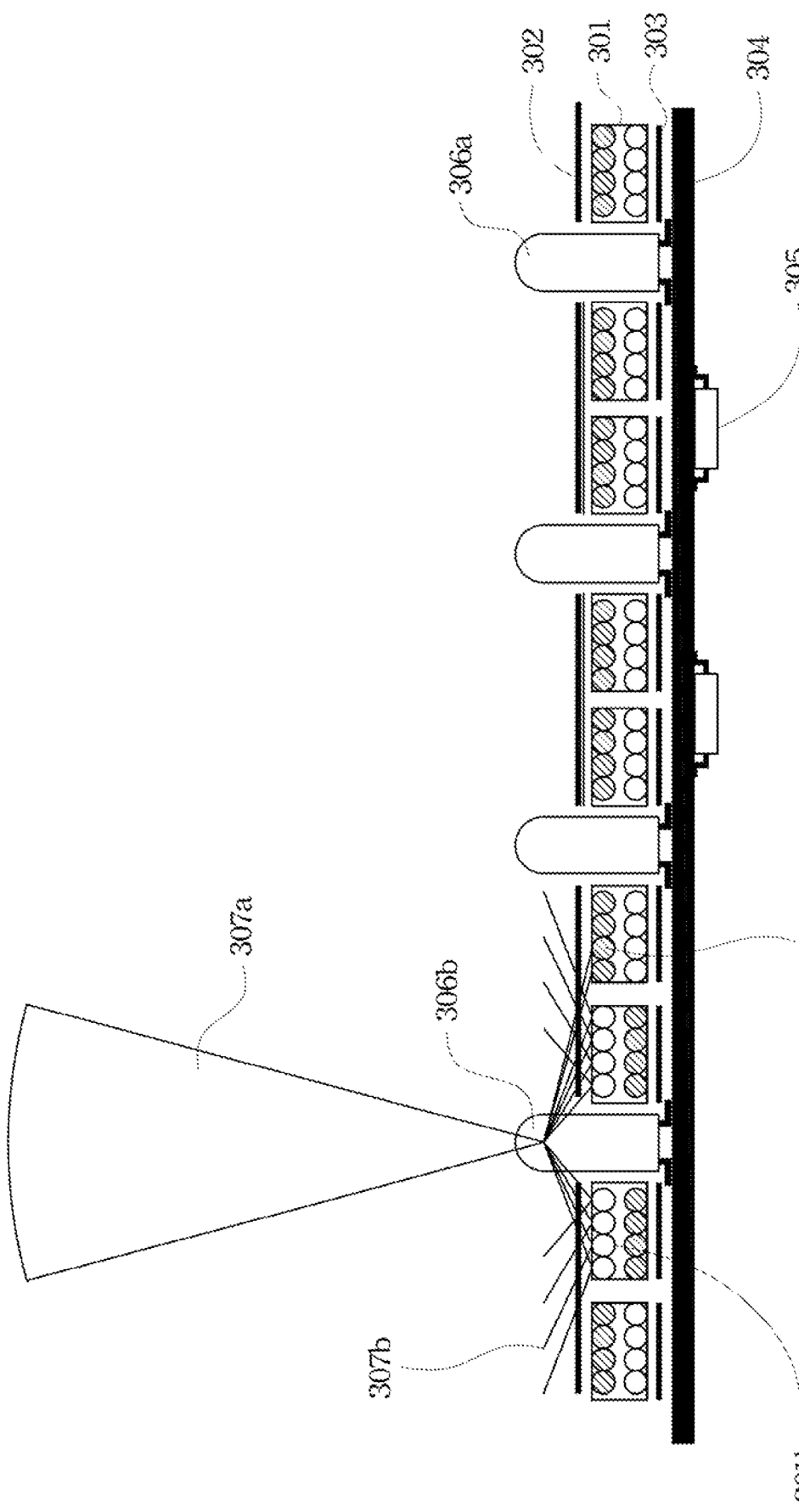

HIGH EFFICIENCY ELECTRONIC DISPLAY DEVICE AND DISPLAY SYSTEM USING THE SAME

RELATED APPLICATIONS

This application is a continuation-in-part application of a non-provisional application Ser. No. 11/152,200, filed Jun. 15, 2005, which is herein incorporated by reference.

BACKGROUND

1. Field of Invention

The present invention relates to a high efficiency electronic display device, especially to the like electronic paper display equipment made by electrophoretic display elements (EPD) and the adding cooperation for LED.

2. Description of Related Art

The electrophoretic display elements, called E-paper traditionally, are becoming more mature gradually in the field of electronic display equipment. The characteristics are low-rate of power consumption, thin thickness of 0.1 mm, display of self-maintain content, non-self-luminescence, etc.; wherein the low-rate of power consumption applying onto information display equipment may be a great advantage, and such equipment being operated based on battery without other power sources shall save a great cost of preparation. Thus the traditional LED display may be a disadvantage. In addition, the equipment for EPD having the features of lightweight and small size may be installed anywhere very easily, and this is superior than prior arts.

On the contrary, the main weakness of the equipment constructed by EPD is non-self-luminescence. Therefore at least one light source may be a necessity in a dark place or at night, and the low-rate of power consumption shall be lost. In the present situation, the sites for applying EPD are then restricted.

The inventor of the present invention has developed the technology related to the electronic display equipment for a long time and produced the device of the present invention. It is to combine the display equipment with EPD and LED; hence the device is able to display information by means of EPD in the daytime and LED light at night. The total amount of LED and related components of the device is 1/10 of the LED display traditionally used. Therefore the difference between the two devices is huge, because LEDs of the device of the present invention may be installed in the places where LEDs should be at night. Comparing with the EPD lighted by external light source, the present device is capable of saving 50-80% energy.

LEDs only light up the area where EPD display, other area without the LED need having contrast luminance comparing with the LED light may promote the light effect. As aforesaid, the high efficiency electronic display device only needs 1/10 of the amount of LEDs and related components of traditional LED display; further, the device weight of the present invention is totally different.

The present device is not suitable for display equipment with small size and more display points per square unit. Generally, display point being 10 mm may be acceptable, but other smaller display points may be involved in the present invention.

Please refer to FIG. 1, which is a side view of an EPD structure in prior arts. Two electrodes 102 and 103 on two sides of an electrophoretic material 101 connected to a voltage 104 are able to attract or repel charged particles with different colors, and a display unit is thus composed. FIG. 2 is a sketch for an EPD display in prior arts (slash areas represent dark pixels).

SUMMARY

The present invention mainly provides a high efficiency electronic display device, which related to a like electronic paper display equipment made by EPD and the adding cooperation for LED, featuring to display information by means of EPD in the daytime and LED light while not having enough light.

According to an aspect of the present invention disclosed herein, a display system includes a EPD and LED matrix, a power generating unit, a battery, a radio frequency module, an LED driver and an EPD driver. The EPD and LED matrix includes electrophortetic display elements (EPDs) and light emitting display elements (LEDs) of the same numbers, and each of the EPDs is paired with a corresponding one of the LEDs. The power generating unit is for generating power. The battery is for storing the power generated by the power generating unit and supplying power to the EPD and LED matrix. The radio frequency module is for receiving a content to be displayed on the EPD and LED matrix. The LED driver and EPD driver are for driving the LEDs and EPDs respectively according to an environment, in which the display system is located, is in a daytime mode or a nighttime mode.

Accord to another embodiment disclosed herein, the EPD and LED matrix further includes an upper electrode, a lower electrode and a printed circuit board. The printed circuit board is disposed closer to the lower electrode than the upper electrode, wherein the EPDs and the LEDs are disposed between the upper electrode and lower electrodes. A plurality of holes are formed through the upper electrode and lower electrodes, and among the plurality of EPDs for exposing the LEDs. Each of the LEDs is mounted on the printed circuit board and extends through each of the plurality of holes and protrudes out of a level along which the upper electrode is disposed.

Accord to another embodiment disclosed herein, the display system includes a center control unit for receiving information from the light sensor or the radio frequency module and sending control orders to the LED driver and EPD driver.

Accord to another embodiment disclosed herein, the EPD and LED matrix further includes an upper electrode, a lower electrode and a printed circuit board. The upper electrode and lower electrode are disposed at two different levels. The printed circuit board is disposed closer to a first level along which the lower electrode is disposed than a second level along which the upper electrode is disposed, wherein the EPDs and the LEDs are disposed between the upper electrode and lower electrodes. A plurality of holes are formed through the upper electrode and lower electrodes, and among the plurality of EPDs for exposing the LEDs. Each of the LEDs is mounted on the printed circuit board and extends through each of the plurality of holes and protrudes out of a level along which the upper electrode is disposed.

Accord to another embodiment disclosed herein, the display system includes a center control unit for receiving information from the light sensor or the radio frequency module and sending control orders to the LED driver and EPD driver.

Accord to another embodiment disclosed herein, the power generating unit is a solar power generator or a wind power generator.

According to another aspect of the present invention disclosed herein, a method for using the display system includes the following steps. Turning off the LEDs and using only the EPDs to display when the display system is in the daytime mode. Using both the LEDs and EPDs to display when the display system is in the nighttime mode.

Accord to another embodiment disclosed herein, the method further includes the step of driving the EPDs, which are paired with the unemitting LEDs, to be darker than the EPDs, which are paired with the emitting LEDs, when the display system is in the nighttime mode.

According to another aspect of the present invention disclosed herein, a display system includes an EPD and LED matrix, an LED driver and an EPD driver and a center control unit. The EPD and LED matrix includes electrophoretic display elements (EPDs) and light emitting display elements (LEDs) of the same numbers, and each of the EPDs is paired with a corresponding one of the LEDs. The LED driver and EPD driver are for driving the LEDs and EPDs respectively according to an environment, in which the display system is located, is in a daytime mode or a nighttime mode. The center control unit is adapted for turning off the LEDs and using only the EPDs to display when the display system is in the daytime mode; and using both the LEDs and EPDs to display when the display system is in the nighttime mode.

Accord to another embodiment disclosed herein, the center control unit is further adapted for controlling the EPDs, which are paired with the unemitting LEDs, to be darker than the EPDs, which are paired with the emitting LEDs, when the display system is in the nighttime mode.

Accord to another embodiment disclosed herein, the display system further includes a power generating unit and a battery. The power generating unit is for generating power. The battery is for storing the power generated by the power generating unit and supplying power to the EPD and LED matrix.

Accord to another embodiment disclosed herein, the display system further includes a radio frequency module for receiving a content to be displayed on the EPD and LED matrix.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 3B is a cross-sectional view of a high efficiency electronic display device with EPD and LED according another embodiment of the present invention;

DESCRIPTION OF THE PREFERRED EMBODIMENTS

Figure 1:
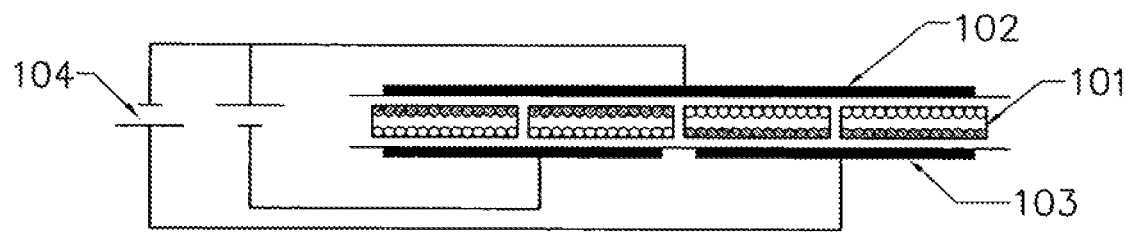
FIG. 1 is a side view of an EPD structure in prior arts.
Figure 2:
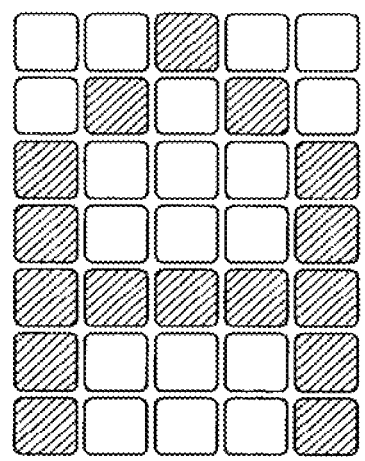
FIG. 2 is a sketch for an EPD display in prior arts.

Reference will now be made in detail to the present preferred embodiments of the invention, examples of which are illustrated in the accompanying drawings. Wherever possible, the same reference numbers are used in the drawings and the description to refer to the same or like parts.

To make it easier for our examiner to understand the objectives of the invention, structure, innovative features, and performance, we use a preferred embodiment together with the attached drawings for the detailed description of the invention.

Figure 3A:
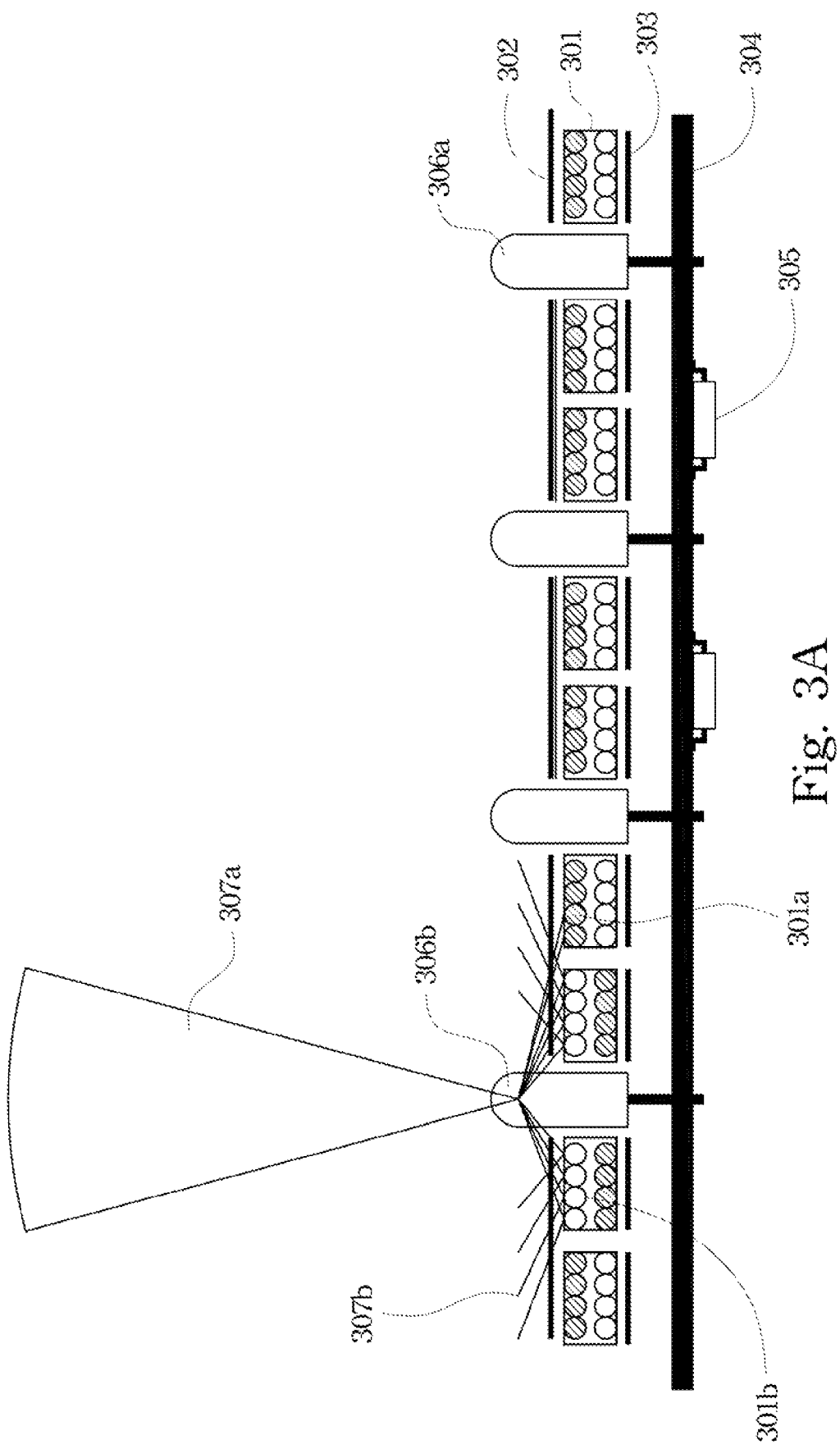
FIG. 3A is a cross-sectional view of a high efficiency electronic display device with EPD and LED according an embodiment of the present invention.

Referring to both FIG. 3A and FIG. 3B, wherein FIG. 3A is a cross-sectional view of a high efficiency electronic display device with EPD and LED according an embodiment of the present invention, and FIG. 3B is a cross-sectional view of a high efficiency electronic display device with EPD and LED according another embodiment of the present invention. The LEDs (306a, 306b) in FIG. 3A are DIP LEDs (dual-in-line package LEDs) while the LEDs (306a, 306b) in FIG. 3B are SMD (Surface Mount Device) LEDs. Basically, the display device comprises a plurality of EPDs 301, an upper electrode 302, a lower electrode 303, a plurality of LEDs (306a, 306b), an LED PCB 304 and a plurality of controlling elements 305. The LED PCB 304 is closer to the lower electrode than the upper electrode, and the EPDs 301 and LEDs (306a, 306b) are located between the upper electrode 302 and the lower electrode 303. A plurality of holes are formed through the upper electrode 302 and lower electrode 303, and among the plurality of EPDs 301 for exposing the LEDs (306a, 306b). Each of the LEDs (306a, 306b) is mounted on the LED PCB 304 and extends through each of the plurality of holes and protrudes out of a level along which the upper electrode 302 is disposed. The EPD 301 is smaller than 0.1 mm and a tiny close unit. A display film is composed of EPDs 301, an upper electrode 302, a lower electrode 303, and has holes to easily expose the LEDs (306a, 306b). The LED PCB 304 includes controlling elements 305 for controlling LEDs (306a, 306b) and EPDs 301 either simultaneously or separately, based on the appropriate level of emitted light, e.g. the level of light needed for daylight use (primarily using EPD to display) as compared with the level of light needed for night use (including LED emitted light). Therefore, the whole device is constructed by a simple and fast way, but with high efficiency.

Figure 4:
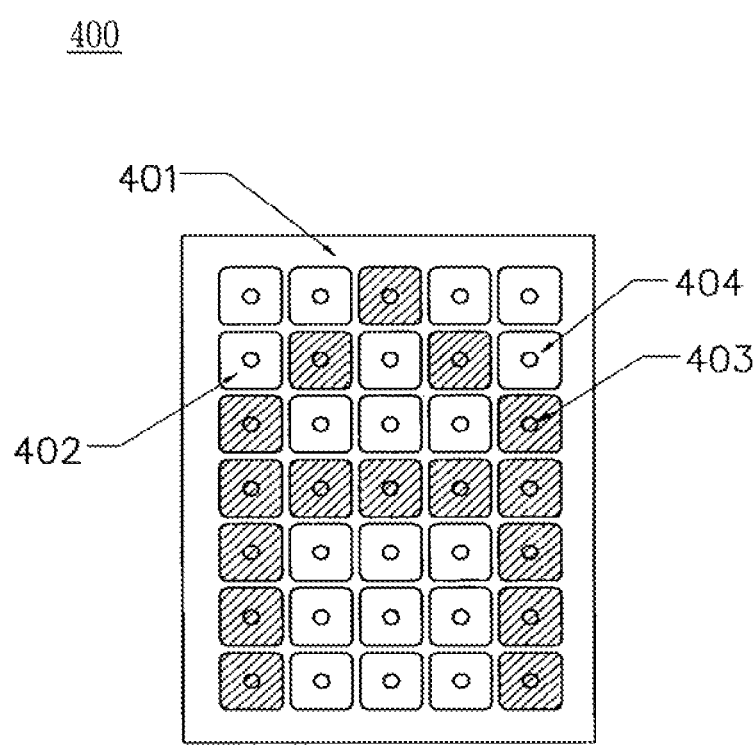
FIG. 4 is a sketch of the high efficiency electronic display device with EPD and LED of the present invention.

FIG. 4 is a sketch of the high efficiency electronic display device with EPD and LED of the present invention. In this embodiment there are 5×7 EPD figure factors 402 and 404 in a display device 401 including LED 403. In FIG. 4 it is assumed that the black figure (as a reversed condition) is illuminating an English character "A" During daytime, the brightness is adequate for the information to be illuminated by the EPD figure factors 402 & 404. When the brightness is inadequate or at night, each EPD is illuminated by its paired LED 403.

Figure 5:
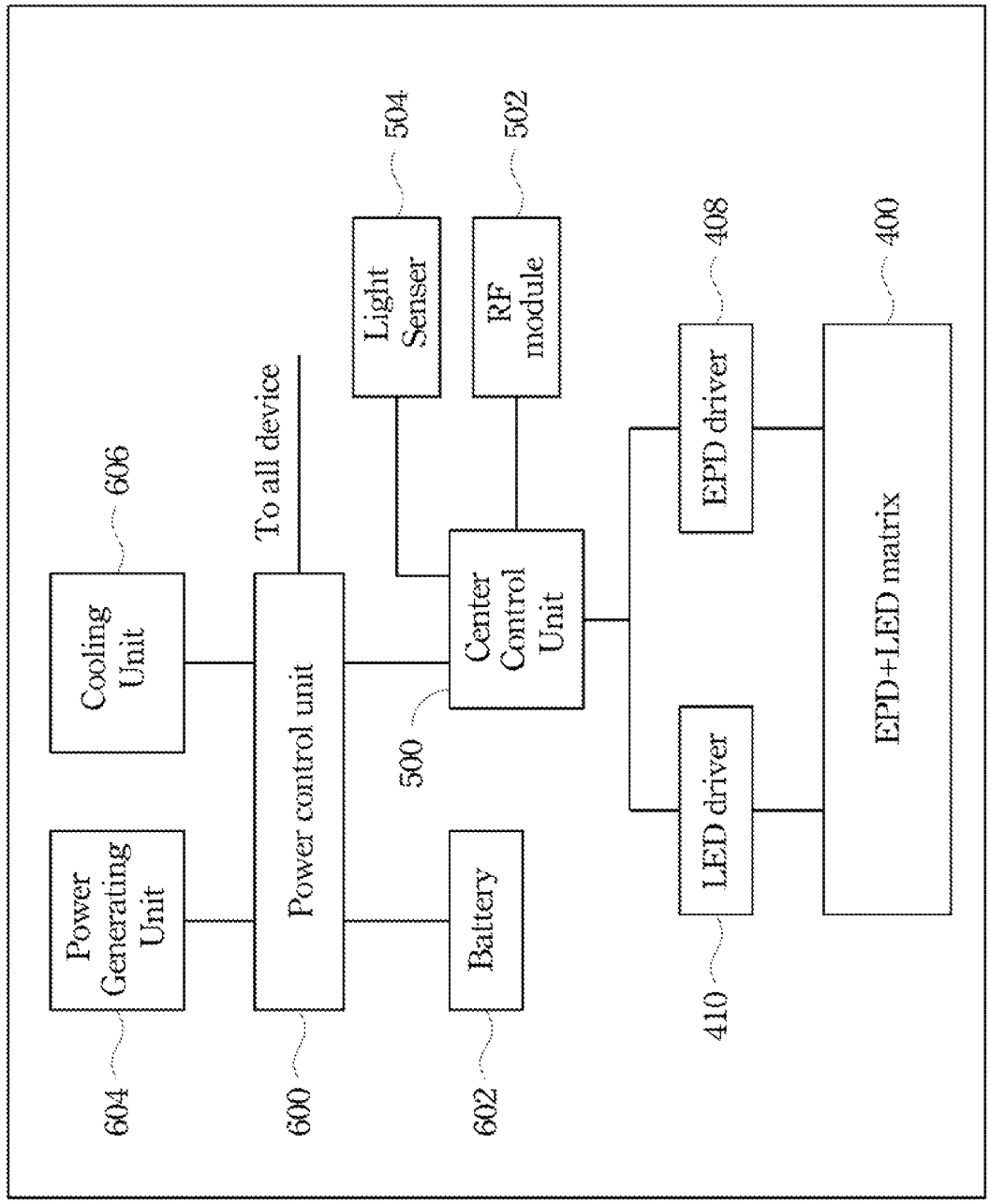
FIG. 5 illustrates a display system functional block diagram according to an embodiment of the present invention.

FIG. 5 illustrates a display system block diagram according to an embodiment of the present invention. The display system basically includes an EPD and LED matrix 400, which includes electrophortetic display elements (EPDs) and light emitting display elements (LEDs) of the same numbers. Each of the EPDs is paired with a corresponding one of the LEDs (as illustrated in FIG. 4). A light sensor 504 may be installed in this display system for deciding an environment where the display system is located is in a daytime mode or a nighttime mode. However, the light sensor 504 is not an essential element in this display system because the daytime mode or nighttime mode can also be decided by other ways or devices, e.g. a voltage level of a solar power generator or a timetable. A radio frequency module 502 may be installed in this display system for receiving a content to be displayed on the EPD and LED matrix. An LED driver 410 and an EPD driver 408 receive commands from a center control unit 500 and drive the LEDs and EPDs respectively according to the daytime mode or the nighttime mode. For example, when the light sensor 504 senses that the display system is in the daytime mode, the LED driver 410 turns off all the LEDs and the EPD driver 408 is used only to drive EPDs to display such that the display system consumes little power in the daytime mode. When the light sensor 504 senses that the display system is in the nighttime mode, both the LED driver 410 and EPD driver 408 are used to drive EPDs and LEDs to display respectively.

The display system may include a power management system, which includes a power control unit 600, a power generating unit 604, a cooling unit 606 and a power generating unit 604. A power generating unit 604 is to generate power by converting solar radiation or wind into electricity such that the power generating unit 604 can be a solar power generator or a wind power generator. Take the solar power generator as a power generating unit for the display system for example, the solar power generator produces electricity in the daytime. Since all the LEDs turns off in the daytime and the EPDs need little power, most power can be saved in the battery 602 for the LEDs' operation in the nighttime, which consumes larger power. The cooling unit 606 is to dissipate heat of the power management system. The power control unit 600 is connected to all electrical components (e.g. the EPD and LED matrix etc.) within the display system and supply with power.

Because the LEDs do not consume power in the daytime and only consume power in the nighttime, the display system consumes about 1/10 power of a display system consisting of all pure LEDs. Therefore, a solar power generator or a wind power generator can supply enough power for the display system's normal operation. The display system can be installed beside a high way through a desert or a wildness area.

Referring to FIG. 3A, FIG. 3B, FIG. 4 and FIG. 5, when the light sensor 504 senses that the display system is in the nighttime mode, the center control unit 500 is further adapted for controlling the EPDs (e.g. EPDs 301a in FIG. 3A or FIG. 3B), which are paired with the unemitting LEDs (e.g. LED 306a in FIG. 3A or FIG. 3B), to be darker than the EPDs (e.g. EPDs 301b in FIG. 3A or FIG. 3B), which are paired with the emitting LEDs (eg. LED 306b in FIG. 3A or FIG. 3B) so as to enhance a display contrast ratio of the EPD and LED matrix 400. That is, the EPDs (e.g. EPDs 301b in FIG. 3A or FIG. 3B), which are paired with the emitting LEDs (eg. LED 306b in FIG. 3A or FIG. 3B), are driven to be brighter than the EPDs (e.g. EPDs 301a in FIG. 3A or FIG. 3B), which are paired with the unemitting LEDs (eg. LED 306a in FIG. 3A or FIG. 3B). Because the brighter EPDs (e.g. EPDs 301b in FIG. 3A or FIG. 3B) can reflect light beams 307b from the emitting LEDs 306b and add up to the light beams 307a, the paired EPD 301b and LED 306b is even brighter than the paired EPD 301a and LED 306a. With this regard, the EPD and LED matrix 400 can be more readable in the nighttime.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display system comprising:
    a EPD and LED matrix comprising electrophortetic display elements (EPDs) and light emitting display elements (LEDs) of the same numbers, and each of the EPDs is paired with a corresponding one of the LEDs;
    a power generating unit for generating power;
    a battery for storing the power generated by the power generating unit and supplying power to the EPD and LED matrix;
    a radio frequency module for receiving a content to be displayed on the EPD and LED matrix; and
    an LED driver and an EPD driver for driving the LEDs and EPDs respectively according to an environment, in which the display system is located, is in a daytime mode or a nighttime mode.

2. The display system of claim 1, wherein the EPD and LED matrix further comprises:
    an upper electrode and a lower electrode;
    a printed circuit board disposed closer to the lower electrode than the upper electrode, wherein the EPDs and the LEDs are disposed between the upper electrode and lower electrodes;
    a plurality of holes being formed through the upper electrode and lower electrodes, and among the plurality of EPDs for exposing the LEDs,
    wherein each of the LEDs is mounted on the printed circuit board and extends through each of the plurality of holes and protrudes out of a level along which the upper electrode is disposed.

3. The display system of claim 2, further comprising a center control unit for receiving information from the light sensor or the radio frequency module and sending control orders to the LED driver and EPD driver.

4. The display system of claim 1, wherein the EPD and LED matrix further comprises:
    an upper electrode and a lower electrode disposed at two different levels;
    a printed circuit board disposed closer to a first level along which the lower electrode is disposed than a second level along which the upper electrode is disposed, wherein the EPDs and the LEDs are disposed between the upper electrode and lower electrodes;
    a plurality of holes being formed through the upper electrode and lower electrodes, and among the plurality of EPDs for exposing the LEDs,
    wherein each of the LEDs is mounted on the printed circuit board and extends through each of the plurality of holes and protrudes out of the second level along which the upper electrode is disposed.

5. The display system of claim 4, further comprising a center control unit for receiving information from the light sensor or the radio frequency module and sending control orders to the LED driver and EPD driver.

6. The display system of claim 1, wherein the power generating unit is a solar power generator or a wind power generator.

7. A method for using the display system of claim 1 comprising:
    turning off the LEDs and using only the EPDs to display when the display system is in the daytime mode; and
    using both the LEDs and EPDs to display when the display system is in the nighttime mode.

8. The method of claim 7 further comprising:
driving the EPDs, which are paired with the unemitting LEDs, to be darker than the EPDs, which are paired with the emitting LEDs, when the display system is in the nighttime mode.

9. A display system comprising:
a EPD and LED matrix comprising electrophortetic display elements (EPDs) and light emitting display elements (LEDs) of the same numbers, and each of the EPDs is paired with a corresponding one of the LEDs;
an LED driver and an EPD driver for driving the LEDs and EPDs respectively according to an environment, in which the display system is located, is in a daytime mode or a nighttime mode; and
a center control unit adapted for:
turning off the LEDs and using only the EPDs to display when the display system is in the daytime mode; and
using both the LEDs and EPDs to display when the display system is in the nighttime mode.

10. The system of claim 9, wherein the center control unit is further adapted for controlling the EPDs, which are paired with the unemitting LEDs, to be darker than the EPDs, which are paired with the emitting LEDs, when the display system is in the nighttime mode.

11. The system of claim 9, further comprising:
a power generating unit for generating power; and
a battery for storing the power generated by the power generating unit and supplying power to the EPD and LED matrix.

12. The system of claim 9, further comprising:
a radio frequency module for receiving a content to be displayed on the EPD and LED matrix.

\* \* \* \* \*